United States Patent Office.

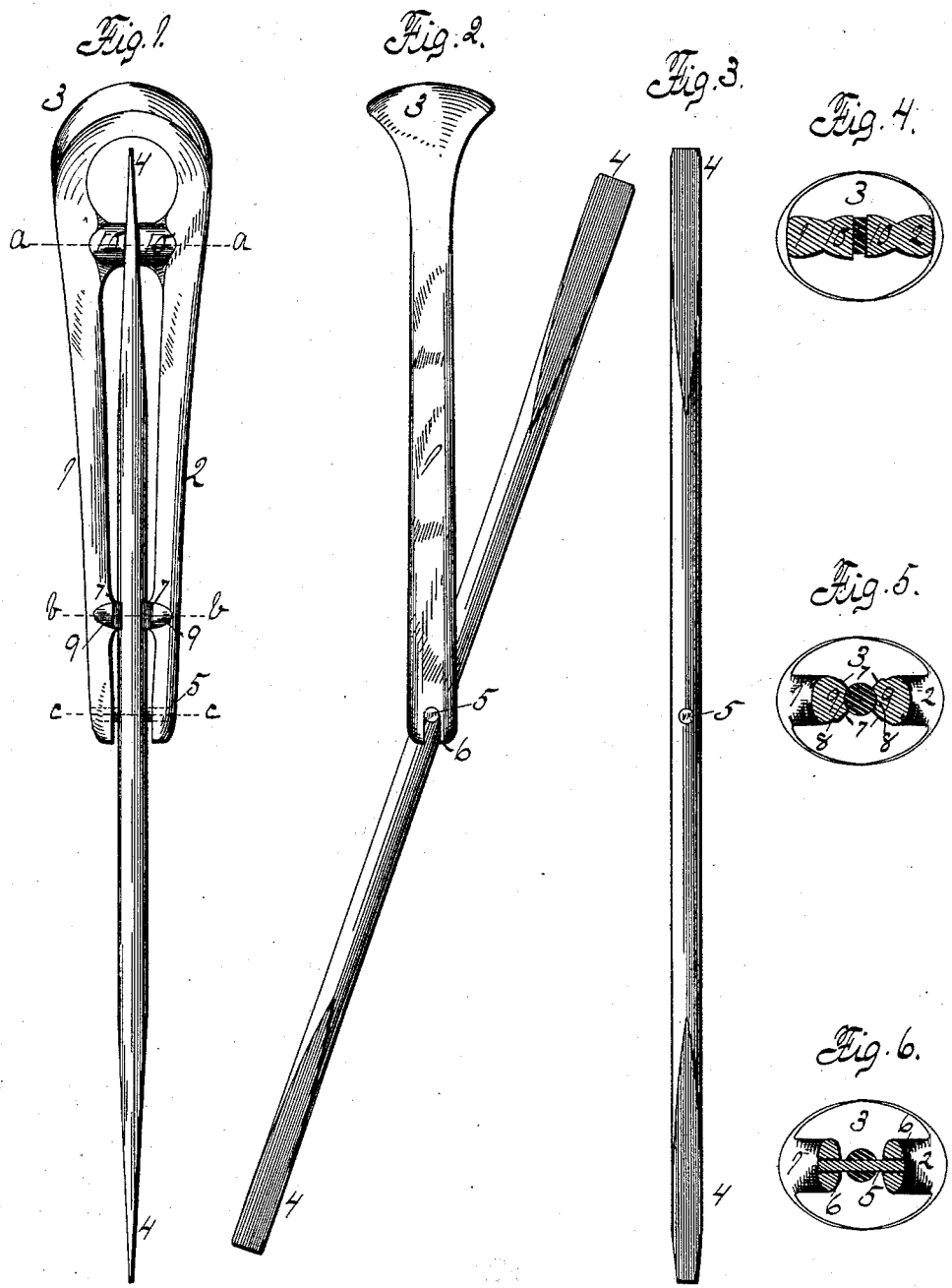

WILL R. JOHNS, OF ROCKFORD, ILLINOIS, ASSIGNOR OF ONE-HALF TO GEORGE W. MIDGLEY, OF SAME PLACE.

SCREW-DRIVER.

SPECIFICATION forming part of Letters Patent No. 422,791, dated March 4, 1890.

Application filed July 2, 1889. Serial No. 316,286. (No model.)

*To all whom it may concern:*

Be it known that I, WILL R. JOHNS, a citizen of the United States, residing at Rockford, in the county of Winnebago and State of Illinois, have invented certain new and useful Improvements in Screw-Drivers, of which the following is a specification.

The object of this invention is to construct a screw-driver blade having its ends produced in screw-driver form and a handle to hold the blade, by means of which a screw may be turned.

In the accompanying drawings, Figure 1 is a face elevation of a screw-driver embodying my invention. Fig. 2 is an edge elevation showing the blade turned on its pivot connecting it with the handle. Fig. 3 is a face elevation of a blade capable of use in connection with the handle herein shown. Fig. 4 is a transverse section on dotted line $a$, Fig. 1. Fig. 5 is a transverse section on dotted line $b$, Fig. 1. Fig. 6 is also a transverse section on dotted line $c$, Fig. 1.

The handle consists of two arms 1 and 2 and an end portion 3 cast integral.

The screw-driver blade herein represented in this instance is made from round steel, having its ends 4 produced in flattened form suitable for the purpose of a screw-driver. A pin 5 is passed through a transverse opening through the blade about midway of its length and projects each side of the blade.

The ends of the handle are slotted, as at 6, said slot being of a size to freely admit the pin 5 of the blade. In placing a blade in position it is placed between the arms of the handle and the pin of the blade entering the slotted ends of the handle, as shown at Fig. 2. This pin and slot form the connection between the blade and handle upon which the blade rotates. After the blade has been thus fixed the inner end is pressed toward the center of the handle and comes in contact with the inclined faces 7, which movement will press the arms slightly outward, allowing the blade to enter the concave seats 8, formed in the faces of the projection 9. Lugs 10 are provided near the upper end portion 3 of the handle of such form to receive the flat portion of the blade, and by means of which the blade is turned, so as not to bring the strain upon the pin 5 in its connection with the ends of the handle. The concave faces give the blade a position in the lengthwise direction of the handle.

When it is desired to reverse the blade end for end, the user by pressing on the inner end of the blade releases it from its engagement with the projections 9, thereby permitting it to be revolved on its pivotal connection with the handle and the outer end made to take the place of the inner end.

By the employment of a number of blades having their ends fitted for different-sized screws the blade in the handle may be replaced by another by simply moving the blade in the lengthwise direction of the handle until the pin 5 passes out through the slotted end of the handle and inserting another, as herein described.

In the drawings I have represented the handle having its arms slotted at their ends, but instead of which a pin or screw may be passed through one or both arms and blade, thus forming the pivotal connection between the blade and handle, and which may be removed to allow the substitution of different blades.

I claim as my invention—

1. The combination, with a handle the branches of which are constructed with seats upon their adjacent sides and lugs above said seats, of a tool pivoted in said handle and having a reversible connection therewith, the said tool engaging said lugs and seats, substantially as set forth.

2. The combination, with a handle the branches of which are constructed with incline faces terminating in seats, of a tool pivoted in said handle and having a reversible connection therewith, the said tool engaging the said seats.

3. The combination, with a handle having spring-arms provided with seats projecting from their adjacent sides, of a tool pivoted to said members and engaging said seats, substantially as set forth.

4. The combination, with the skeleton handle having spring-arms, seats upon the adjacent sides of said members, and lugs secured to the adjacent sides of the members above said seats, of a double-pointed blade pivoted to said members at its intermediate portion and having one of its ends engaged with the said seats and lugs, substantially as set forth.

5. The combination, with a handle having spring-arms the ends of which are provided with slots, of a double-pointed blade and a pin passing through the intermediate portion of said blade and the said slots, the said blade having a swinging engagement with said handle, substantially as set forth.

WILL R. JOHNS.

Witnesses:
A. O. BEHEL,
E. BEHEL.